United States Patent [19]

Polaszek

[11] 3,950,880
[45] Apr. 20, 1976

[54] BITE SIGNAL DEVICE FOR FISHING RODS

[76] Inventor: Frank John Polaszek, 445 Rae Ave., Lake Villa, Ill. 60046

[22] Filed: May 22, 1975

[21] Appl. No.: 579,958

[52] U.S. Cl. ................................................ 43/17
[51] Int. Cl.² ..................................... A01K 97/12
[58] Field of Search ........................................ 43/17

[56] References Cited
UNITED STATES PATENTS

| 3,012,352 | 12/1961 | Logsdon | 43/17 |
| 3,143,822 | 8/1964 | Schooley | 43/17 |

FOREIGN PATENTS OR APPLICATIONS

| 1,191,495 | 5/1970 | United Kingdom | 43/17 |
| 1,232,060 | 5/1971 | United Kingdom | 43/17 |

Primary Examiner—Louis G. Mancene
Assistant Examiner—Daniel J. Leach

[57] ABSTRACT

A bite signal device which is attached to the tip section of a fishing rod and which includes adjustable compensating means for adjusting the device for different loading conditions such as the weight of the line, the weight of the bait or lure, or the water currents. The device comprises a cylindrical housing having a semi-circular slot through the cylindrical side wall and a wand rotatively mounted within the housing and extending through the slot outwardly of the housing. The outermost end of the wand has a line guide thereon to receive the fishing line. The adjustable compensating means comprises spring means in the housing for biasing the wand upwardly within the slot and when a fish pulls on the line the wand will pivot downwardly to provide a visual signal.

9 Claims, 6 Drawing Figures

BITE SIGNAL DEVICE FOR FISHING RODS

BACKGROUND OF THE INVENTION

The most common bite signal device for fishing rods is the well known bobber which floats upon the water and which by certain bobbing actions indicates that a fish is biting upon the baited hook or other lure. Fishermen have found that a bobber is generally ineffective under certain fishing conditions such as when fishing through an ice hole. A number of devices have been developed for rendering bite signals when a bobber is inappropriate. One such device is shown in U.S. Pat. No. 3,143,822. While that patent purports to show means for adjusting the sensitivity of the indicating means, substantial adjustment over a wide range of loads upon the line are not provided.

SUMMARY OF THE INVENTION

The present invention comprises a housing which is attachable to the tip section of a fishing rod with the tip line guide or ferrule on one side thereof. A substantially stiff wand member or indicating rod extends outwardly of the housing and is provided at its tip with an eyelet or tip guide. After passing through the rod tip line guide, the fishing line is directed through the tip guide on the wand of the present invention. The wand member extends through a substantially semi-circular slot in the housing, and the inner end is mounted therein for rotation about an axis perpendicular to the longitudinal axis of the wand. A spring means is provided within the housing and connected to the wand to spring bias the wand in one direction about its axis of rotation. When the housing is properly attached to a fishing rod, the extending end of the wand is spring biased upwardly against one end of the housing slot when the fishing rod is held in a normal fishing position. Means are further provided in the present invention for manually adjusting the spring means in the housing to adjust the spring bias on the wand to compensate for different loads upon the line due to different bait, lure or line weights or water currents. The spring bias on the wand is not intended to set the fish hooks but permits the wand to rotate and follow the line as a fish takes the bait or lure.

The tip of the wand is further provided with a brightly colored bead or projection to aid in visually indicating any rotational movement or bobbing of the wand responding to the biting of a fish on the bait or lure.

The primary object of the present invention is to provide a bite signal device for the end of a fishing rod that may be adjusted for different bait, lure or line weights, or water currents, that will indicate that a fish is biting by a pivoting wand, and that will not interfere in the use of the rod to land a fish after the fish hooks have been set.

Other objects and features of the invention will be apparent upon a perusal of the drawings and hereinafter following detailed description.

DETAILED DESCRIPTION OF A PREFERRED EMBODIMENT

Figure 1:
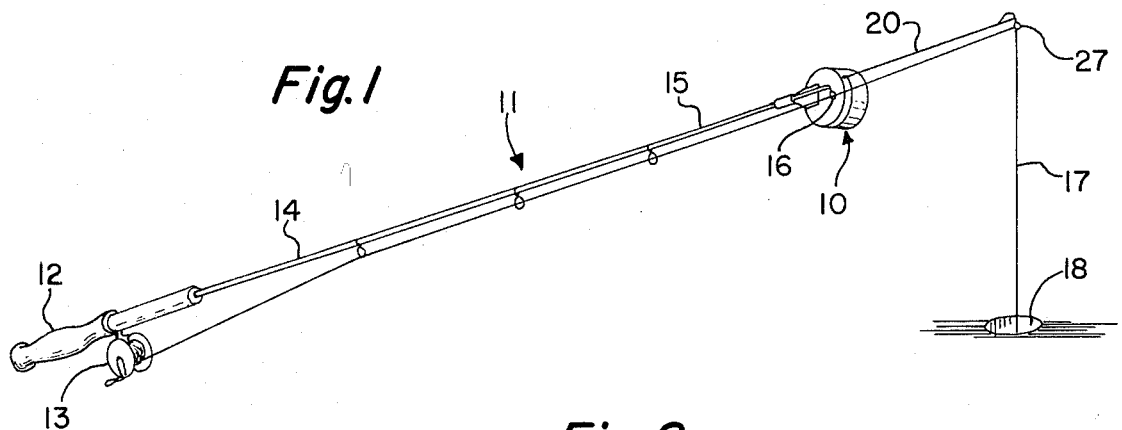
FIG. 1 is a perspective view showing a fishing rod with one embodiment of the invention mounted thereon.

The device 10 of the subject invention is mounted on the end of a fishing rod 11 such as shown in FIG. 1. The fishing rod 11 may be of any suitable known form and generally comprises a handle 12 carrying a reel 13 and one or more extending rod sections 14 and 15. The rod section 15 is the tip section and terminates in a tip line guide 16 shown in FIG. 2. The fishing line 17 is conventionally directed from the reel 13 through the various line guides of the rod sections 14 and 15 and through the tip line guide 16. The bait or lure and fish hooks are secured to the end of the line 17 and, as is known in the art, may cause different drag or load forces on the line 17 dependent upon the weight thereof. As shown in FIG. 1, the line 17 extends through an ice hole 18, a fishing arrangement for which the subject invention is particularly appropriate. The device 10 of the subject invention may also be used on a casting rod. It should be noted that although the device 10 appears in the drawings as an extension of the fishing rod 11, it does not function as a rod extension. In other words, the device 10 can not be used to set the fish hooks nor play the fish. When the bait or lure has been taken by a fish, the wand 20 of the device 10 substantially follows the line 17 as the rod 11 and line 17 are normally used to land the fish.

The device 10 comprises a housing 21 from which the wand 20 extends outwardly thereof. In the embodiment shown in the drawings, the housing 21 is made as two housing sections 21a and 21b. Housing section 21a is a substantially flat circular plate, and housing section 21b is a generally cylindrical cup-shaped member.

Housing section 21a is provided with a bifurcated rod attaching bracket 22 which is secured thereto by any convenient mounting means such as rivets 23. Alternatively, the housing section 21a and the bracket 22 may be integrally made as a one-piece member. The bifurcated end of the bracket 22 permits the device 10 to be secured to the end section 15 of the rod 11 as shown in the drawings. It is further contemplated that the bifurcated end of the bracket 22 may be provided with any known screw operated clamping arrangement to permit the device 10 to be repeatedly attached and removed from one or more fishing rods. When the device 10 is properly attached to a fishing rod, the tip line guide 16 of the rod is positioned within the circumferential area of the housing section 21a as may be seen in FIG. 2. The housing section 21a is secured over the open end of housing section 21b by a plurality of small screws 24 which are threaded into holes in a thickened area of the cylindrical wall portion of the housing section 21b as may be seen in FIG. 6.

The side or substantially cylindrical wall portion of the housing section 21b is provided with a recess 25 from which the wand 20 extends. The recess 25 defines a slot in cooperation with housing section 21a. Alternatively, the recess 25 may be made as a complete slot in the side wall of housing section 21b. Further, the end wall of the housing section 21b is provided with a substantially semicircular slot 26 through which extends the means for adjusting the spring bias on the wand 20.

Figure 6:
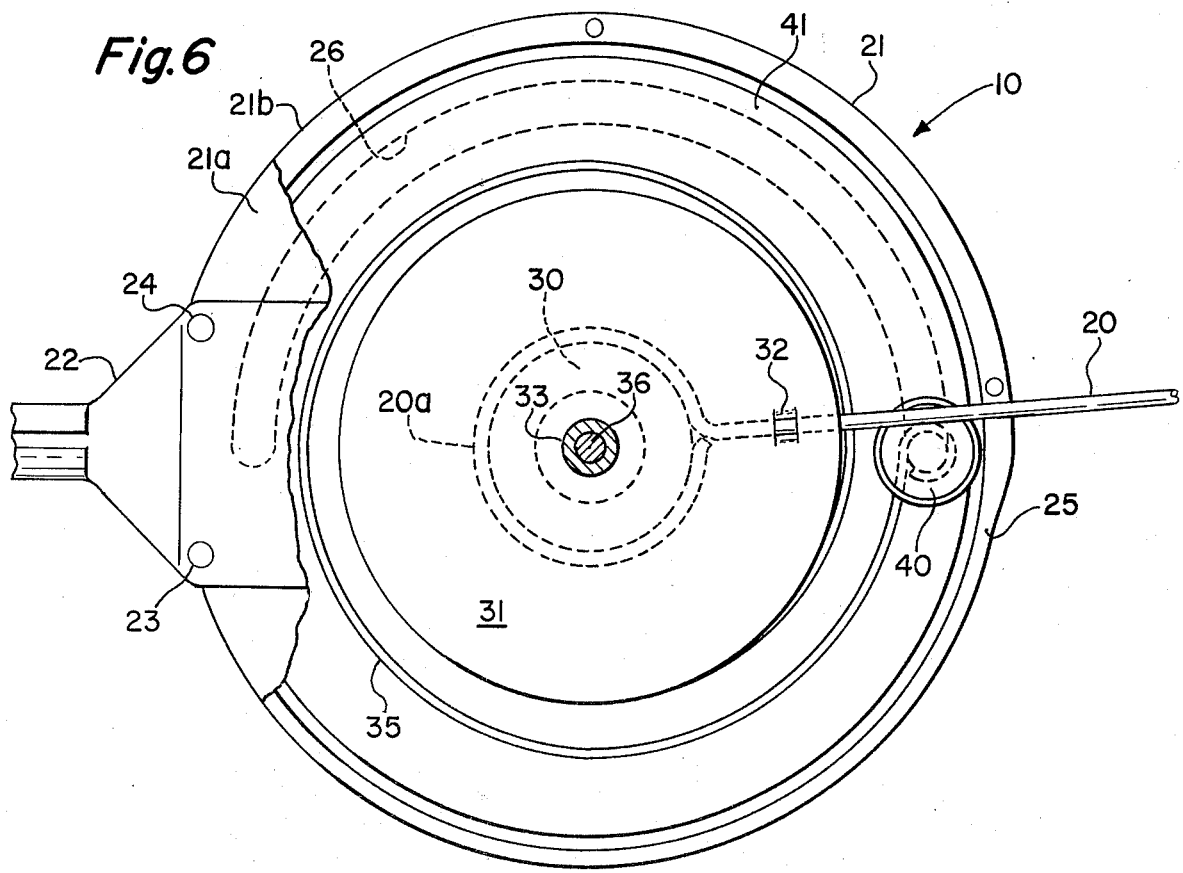
FIG. 6 is an enlarged side elevational view of the housing assembly as shown in FIG. 2 and partially in section.

The inner end of the wand 20 is formed in a circle as may be seen in FIG. 6. The outer end of the wand 20 is provided with a line guide 27 and a vividly colored button or projection 28. The fishing line 17 is threaded from the tip line guide 16 of the rod 11 through the line guide 27 of the wand 20. Obviously, any pivoting movements of the wand 20 caused by a fish biting on the bait or lure at the end of the line 17 are easily observed by watching the projection 28. The wand 20 is preferably formed of a relatively stiff material such as spring steel.

The circular inner end 20a of the wand 20 is mounted about a cylindrical member 30. The cylindrical member 30 is secured to a circular plate 31. The wand 20 is secured for rotational movement with the member 30 and the plate 31 by securing means 32 on the plate 31. The securing means 32 may be tangs struck from the plate 31 or some other known suitable securing means.

A cylindrical sleeve member 33 is secured concentrically through the cylindrical member 30 and to the plate 31. Alternatively, the cylindrical member 30, the plate 31 and the sleeve 33 may be integrally formed as a one-piece member. The annular space between the cylindrical member 30 and the sleeve 33 permits the cylindrical member 30 to be provided with a radial slot 34 therethrough for convenient securing of the inner end 35a of the coiled spring 35 therein as may be seen in FIG. 5.

The sleeve member 33 has a length substantially equal to the distance between the inner surfaces of the housing section 21a and the end wall of the housing section 21b. Alternatively, the sleeve member 33 can be shortened to permit a bearing washer to be concentrically arranged at each end of the member 33 and between the housing walls. The assembly of the sleeve 33, and the plate 31 and the member 30 secured thereto, is rotationally supported within the housing 21 by a pin 36 extending through the housing section 21a and the end wall of the housing section 21b. In the assembly of the device 10, one end of the pin 36 may first be firmly attached to the housing section 21a with the parts within the housing 21 then being mounted thereon and with the other end of the pin 36 then being merely journaled through a hole in the end wall of the housing section 21b.

Figure 4:
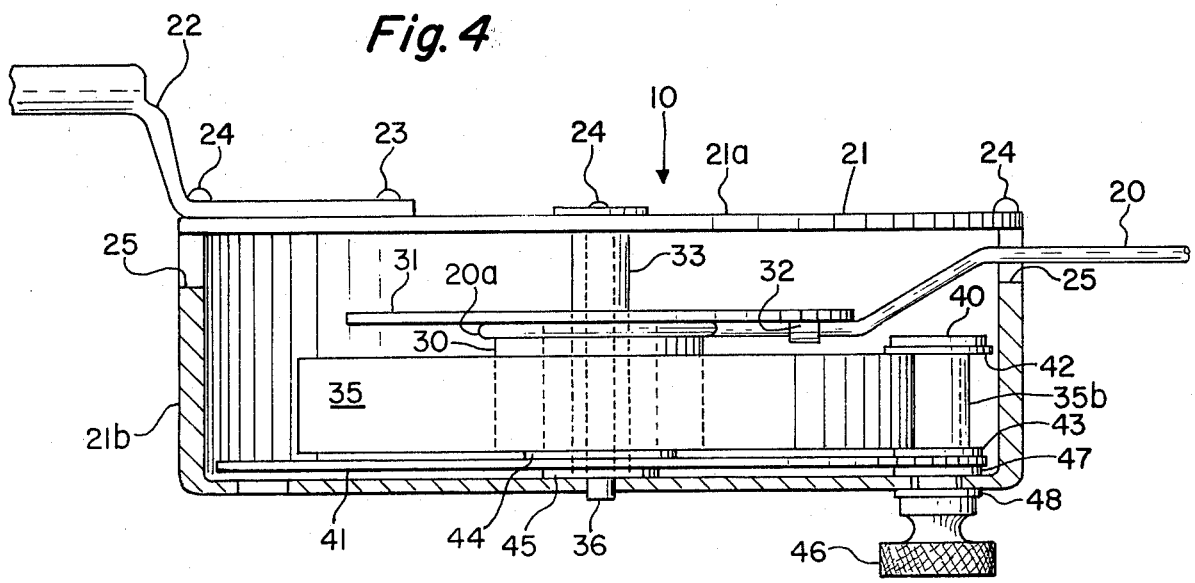
FIG. 4 is an enlarged cross sectional view of the embodiment of the invention shown in FIGS. 1–3 and taken substantially along the line 4—4 of FIG. 2.

From the circular plate 31, the wand 20 is bent to clear the spring bias adjusting means and to extend through the slot 25 in the side wall of the housing 21. It is contemplated that the side wall of the housing 21 may be made axially shorter than shown in FIG. 4 with a corresponding reduction in the length of the sleeve 33 and the pin 36 adjacent to the housing section 21a to provide a more compact arrangement of the parts within the housing 21 with less, or substantially no off-set in the wand 20 from the plate 31 to the slot 25.

Figure 2:
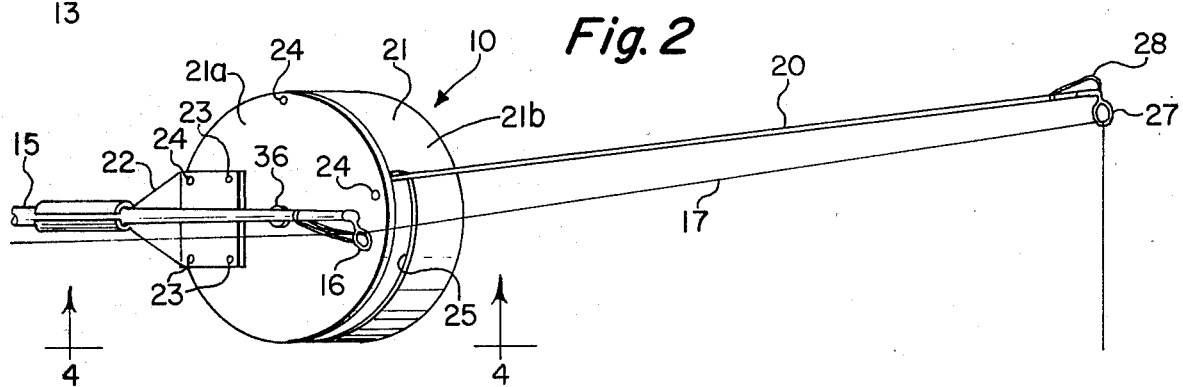
FIG. 2 is an enlarged view of the tip of the fishing rod assembly of FIG. 1.
Figure 3:
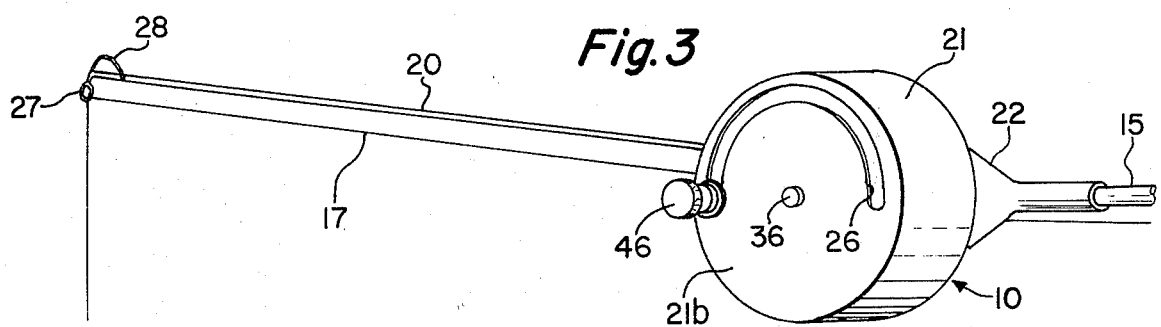
FIG. 3 is a view similar to FIG. 2 but showing the other side of the assembly of FIG. 2.

From the foregoing it may be seen that the wand 20, the plate 31, the annular member 30 and the sleeve 33 are rotatable as a unit about pin 36 from the position shown in FIG. 2 through an angle of approximately 180° with the wand 20 against the tip section 15 of the fishing rod 11. When the end of the line 17 is secured to the rod, the position of the wand 20 against the rod provides a convenient storage position for the device of the invention.

As noted above, the inner end of the coiled spring 35 is secured to the annular member 30. The coiled spring 35 is then wound about the annular member 30 and the other end of the spring 35 is bent into a small cylindrical configuration 35b. A shouldered screw 40 is inserted through the end 35b of the spring 35 with the threaded end of the screw 40 extending through a circular plate 41 and thence through the slot 26 in the housing member 21b to extend therefrom.

Washers 42 and 43 may be provided on each side of the end 35b of the spring 35 respectively between the head of the screw 40 and the circular plate 41.

The circular plate 41 is journaled about the sleeve 33, and spacing washers 44 and 45 may be provided on each side of the plate 41. The plate 41 has a diameter slightly less than the inner diameter of the housing section 21b to cover the slot 26.

The portion of the threaded end of the screw 40 that extends through the plate may be threaded or otherwise secured to the plate 41. The portion of the threaded end of the screw 40 that extends outwardly of the housing 21 is provided with a knurled finger operated nut 46. Washers 47 and 48 may be provided on each side the slot 26 of the housing 21 respectively between the plate 41 and the nut 46.

Figure 5:
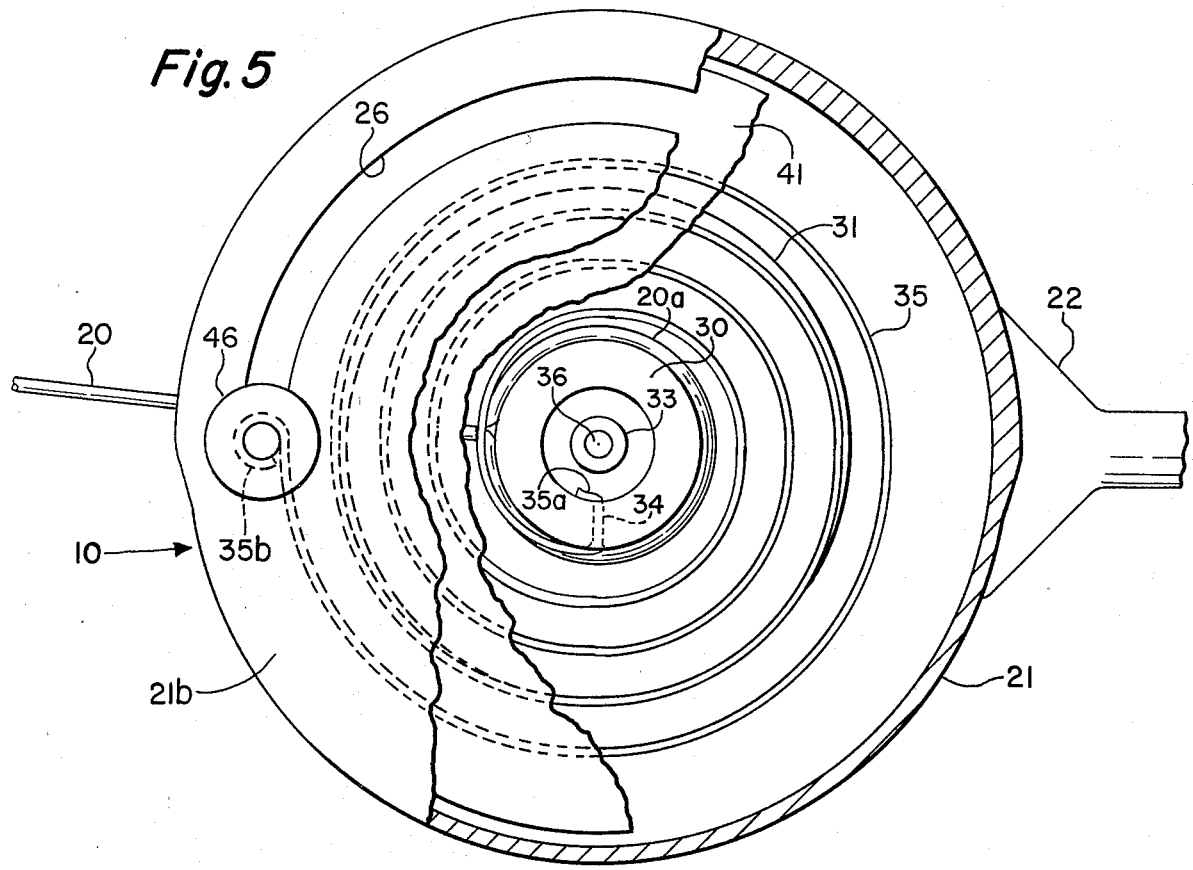
FIG. 5 is an enlarged side elevational view of the housing assembly as shown in FIG. 3 and partially in section.

From the foregoing it may be seen that the coiled spring 35 will spring bias the wand 20 in a clockwise direction as viewed in FIG. 5. That spring bias is varied by loosening nut 46, moving nut 46 and the parts secured thereto along slot 26, and again tightening nut 46 to maintain the adjusted bias position. The spring bias on the wand 20 is at a minimum when the nut 46 is at the position shown in the drawings, and maximum bias is achieved when the nut 46 is moved to the other end of slot 26. As described above, the spring bias on the wand 20 is adjusted to compensate for the load on the line 17 in a fishing condition to enable the biting of a fish upon the bait or lure on the line to be accurately signaled by a pivoting movement of the wand 20. Reductions to practice of the invention have shown that with a minimum of experience a fisherman can use the device of the invention in a wide range of fishing conditions as a sensitive and accurate arrangement for signaling the biting of a fish.

The various parts of the device of the invention, such as the housing 21, the plates 31 and 41, and the annular member 30 and sleeve 33, may be made of a metal such as aluminum or one or more of those parts may be molded of a suitable plastics material.

Having described the invention, it is to be understood that changes can be made in the invention by one skilled in the art within the spirit and scope of the hereinafter following claims.

I claim:

1. A bite signal device for a fishing rod comprising a housing having a pair of substantially circular end walls interconnected with a substantially cylindrical side wall, said side wall having a substantially semicircular slot therethrough, attaching means on said housing for mounting said device on the end of a fishing rod with the tip line guide of said fishing rod adjacent to and within the circumferential perimeter of one end of said end walls and with said semi-circular slot disposed substantially below the longitudinal axis of said rod, a wand, means rotatively mounting one end of said wand within said housing with said wand extending through said semi-circular slot and outwardly of said side wall of said housing, the outwardly extending end of said wand having a line guide thereon, and spring means in said housing for spring biasing the outwardly extending end of said wand in a direction upwardly of said rod when said device is mounted on said rod with the tip line guide of said rod adjacent to and within the circumferential perimeter of said one of said end walls and with said semi-circular slot disposed substantially below the longitudinal axis of said rod.

2. In a bite signal device as defined in claim 1, and means for adjusting said spring means to vary the spring bias of said spring means on said wand.

3. In a bite signal device as defined in claim 1, said spring means comprising a coiled spring mounted within said housing and coiled about an axis perpendicular to the planes of said end walls, means connecting one end of said coiled spring to said means rotatively mounting one end of said wand within said housing, and means connecting the other end of said coiled spring to said housing for spring biasing the outwardly extending of said wand in said direction upwardly of said rod.

4. In a bite signal device as defined in claim 3, and said last mentioned means being adjustable to vary the spring bias of said coiled spring on said wand.

5. In a bite signal device as defined in claim 4, and said last mentioned means being manually adjustable to manually vary the spring bias of said coiled spring on said wand.

6. In a bite signal device as defined in claim 5, and said last mentioned means comprising the other of said end walls of said housing having a substatially semi-circular bias adjusting slot therethrough, a member in said housing and secured to said other end of said coiled spring and extending through said bias adjusting slot, and fastening means on the extending portion of said member for manually securing said member in selected positions along said bias adjusting slot to manually vary the spring bias of said spring on said wand.

7. In a bite signal device as defined in claim 6, wherein said extending portion of said member is threaded, and said fastening means comprises a finger operated nut threaded on said extending portion of said member and capable of being manually rotated to secure said member to said housing in any selected position along said bias adjusting slot.

8. In a bite signal device as defined in claim 7, and a cover plate for said bias adjusting slot, and said cover plate rotatively mounted within said housing adjacent said other wall of said housing and connected to said member to rotate therewith.

9. In a bite signal device as defined in claim 1, said means rotatively mounting said one end of said wand within said housing comprising said one end of said wand being formed substantially in a circular configuration, a substantially circular plate having a diameter substantially larger than the diameter of said circular configuration of said one end of said wand, means mounting said circular plate in said housing for rotation about an axis perpendicular to the planes of said end walls, and means securing said one end of said wand concentrically within and against one side of said circular plate.

* * * * *